UNITED STATES PATENT OFFICE.

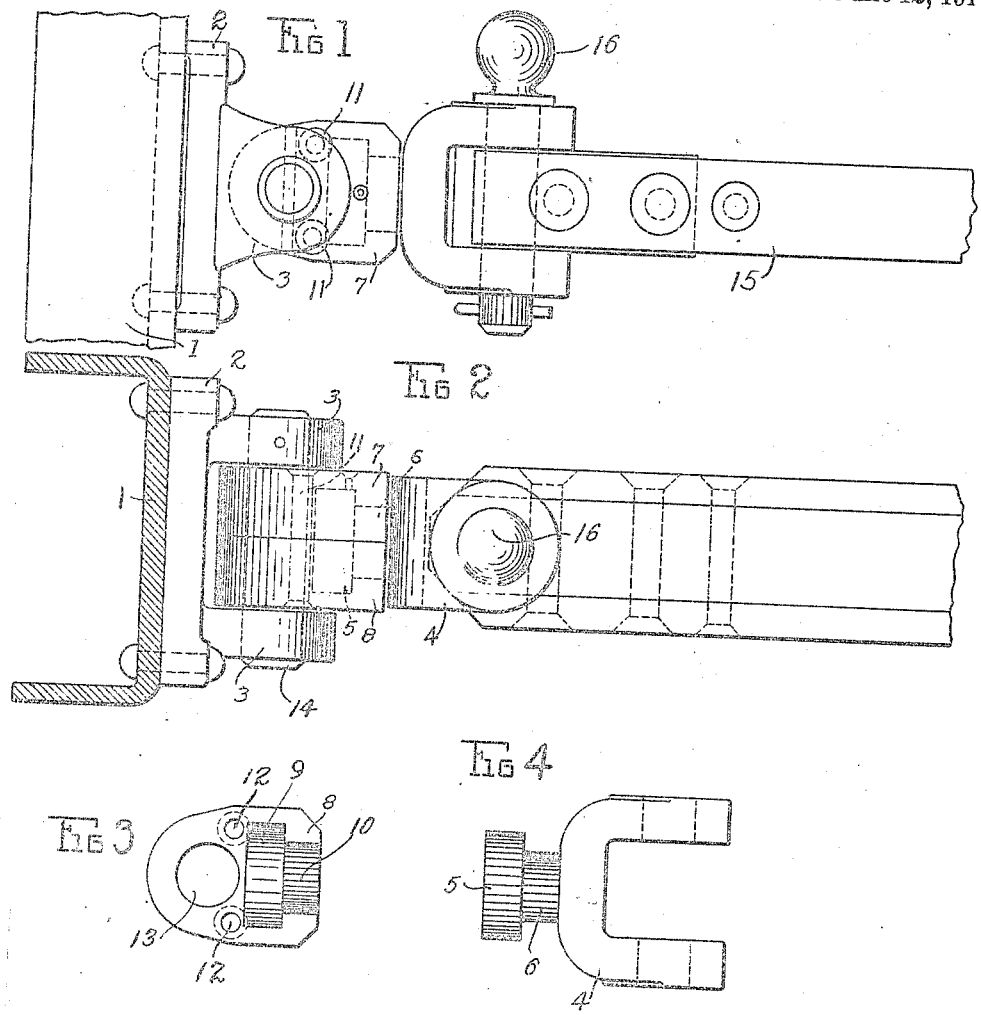

WARREN R. HUDSON, OF TROY, OHIO, ASSIGNOR TO THE TROY WAGON WORKS COMPANY, OF TROY, OHIO, A CORPORATION OF OHIO.

COUPLING.

1,229,465.　　　Specification of Letters Patent.　　　Patented June 12, 1917.

Application filed January 26, 1917.  Serial No. 144,673.

*To all whom it may concern:*

Be it known that I, WARREN R. HUDSON, a citizen of the United States, residing at Troy, in the county of Miami and State of Ohio, have invented certain new and useful Improvements in Couplings, of which the following is a specification.

This invention relates to a coupling especially designed for hitching a trailer truck to a motor truck or other road engine.

The object of the invention is to provide a coupling of the character referred to which will be strong and simple in construction and one also which will allow the trailer to have all the necessary relative movements with respect to the motor vehicle without binding the coupling or endangering its efficiency by breakage.

In the accompanying drawings:—

Figure 1 is a top plan view of a coupling embodying my improvements.

Fig. 2 is a side view of the same.

Figs. 3 and 4 are details.

In the drawings, 1 represents a portion of the rear frame of a motor truck or other power propelled road vehicle to which is connected by riveting, bolting or otherwise the plate or bar 2. This plate 2 has a pair of vertically alined ears 3. A yoke 4 has a circular head 5 integrally connected therewith by the neck 6 and upon this head is a two-part socket, the members of which are represented by 7 and 8. Each member of the socket is provided with a circular recess 9 and opening 10 leading thereto to receive the head 5 and neck 6, after which the members of the socket are connected together by rivets, 11, or other suitable form of connecting devices which pass through the perforations 12. Each of the socket members has an opening 13 to receive a pin 14 which extends through the ears 3 and is secured therein in any suitable manner. Between the arms of the yoke 4 is pivotally connected a link 15 by a coupling pin 16, this link 15 extending to and being connected with the draft bar of the trailer. An example of this draft bar is shown in the patent to J. Eckart and J. Smith No. 1,117,816 dated November 7th, 1914, and in the present case the link 15 may be provided with a slotted opening and fitted over the pin 14 of the slotted head 10 shown in that patent.

From the construction described it will be seen that a simple and effective arrangement is provided by which the different members of the coupling may have vertical movements, laterally swinging movements and also swiveling movements with respect to each other so as to take care of all of the relative movements of the trailer and motor vehicle due to uneven travel and in turning.

Having thus described my invention, I claim:—

In a coupling of the character described, a link, a yoke-shaped member pivotally connected therewith, a shank extending beyond the yoke-shaped member having a circular head near its outer extremity, a pair of separable socket members having an enlarged recess near the extremity thereof adapted to receive said head, means for fastening said members together, a plate with alined ears, and a coupling pin for connecting said socket members to said plate for the purpose specified.

In testimony whereof, I have hereunto set my hand this 20th day of January 1917.

WARREN R. HUDSON.